United States Patent
Megeid

(10) Patent No.: US 7,966,631 B2
(45) Date of Patent: Jun. 21, 2011

(54) MPEG-4 REMOTE COMMUNICATION DEVICE

(75) Inventor: Magdy Megeid, Zurich (CH)

(73) Assignee: Thomson Licensing, Boulogne-Billcourt (FR)

( * ) Notice: Subject to any disclaimer, the term of this patent is extended or adjusted under 35 U.S.C. 154(b) by 61 days.

(21) Appl. No.: 10/485,772

(22) PCT Filed: Aug. 7, 2002

(86) PCT No.: PCT/EP02/08835
§ 371 (c)(1),
(2), (4) Date: Feb. 4, 2004

(87) PCT Pub. No.: WO03/015414
PCT Pub. Date: Feb. 20, 2003

(65) Prior Publication Data
US 2005/0028222 A1    Feb. 3, 2005

Related U.S. Application Data

(60) Provisional application No. 60/311,044, filed on Aug. 8, 2001.

(51) Int. Cl.
*H04N 7/10* (2006.01)
*H04N 7/025* (2006.01)
(52) U.S. Cl. ......................................... 725/34; 725/135
(58) Field of Classification Search .................. 707/101, 707/736, 899, 913; 725/32–34, 135
See application file for complete search history.

(56) References Cited

U.S. PATENT DOCUMENTS

| | | | |
|---|---|---|---|
| 5,861,906 A * | 1/1999 | Dunn et al. | 725/87 |
| 6,209,132 B1 | 3/2001 | Harrison et al. | 725/141 |
| 7,039,116 B1 * | 5/2006 | Zhang et al. | 375/240.26 |
| 2002/0015107 A1 * | 2/2002 | Ivehammar | 348/468 |
| 2002/0053085 A1 * | 5/2002 | Toguri | 725/51 |
| 2002/0184506 A1 * | 12/2002 | Perlman | 713/182 |
| 2002/0184637 A1 * | 12/2002 | Perlman | 725/87 |
| 2003/0088872 A1 * | 5/2003 | Maissel et al. | 725/46 |

(Continued)

FOREIGN PATENT DOCUMENTS

EP    0952734    10/1999

(Continued)

OTHER PUBLICATIONS

Ahn, SangWoo, et al., "Personalized and Interactive Broadcasting System", 4 pgs., at least as early as Dec. 18, 2003.

(Continued)

*Primary Examiner* — Kimberly Lovel
(74) *Attorney, Agent, or Firm* — Robert D. Shedd; Joseph J. Opalach; Brian J. Cromarty

(57) ABSTRACT

An MPEG-4 based multimedia system in connection with a service provider therefore, and a remote communication device therefore, is presented. The interactive content based remote communication unit simplifies and reduces the number of steps and buttons required for receiving interactive service by the use of MPEG-4 encoded data. Additionally, new ways are disclosed for the data processing at the service provider side. Further, an improved way of exchanging data between the service provider (broadcaster, cable provider) and the customer (viewer) is presented. Still further, there is disclosed how digital equipment (server, set-top box, remote control unit and display) involved in the data processing can be optimized for the task of controlling the available channel bandwidth and displaying the data.

20 Claims, 8 Drawing Sheets

U.S. PATENT DOCUMENTS

2003/0182567 A1* 9/2003 Barton et al. ............... 713/193
2006/0282874 A1* 12/2006 Ito et al. ..................... 725/139

FOREIGN PATENT DOCUMENTS

| EP | 1021039 | 7/2000 |
|---|---|---|
| EP | 1089566 | 4/2001 |
| WO | 00/78050 | 12/2000 |
| WO | 01/35664 | 5/2001 |

OTHER PUBLICATIONS

Kim, Yongsuk, et al., "Interactive Broadcast Terminal System Using MPEG-2 and MPEG-4", ISCAS 2000-IEEE International Symposium Circuits and Systems, May 28-31, 2000, pp. III-682 to III.685.

* cited by examiner

MPEG-4 REMOTE COMMUNICATION DEVICE

This application claims the benefit, under 35 U.S.C. §365 of International Application PCT/EP02/08835, filed Aug. 7, 2002, which was published in accordance with PCT Article 21(2) on Feb. 20, 2003 in English and which claims the benefit of U.S. patent application No. 60/311,044, filed Aug. 8, 2001.

FIELD OF THE INVENTION

The present invention concerns multimedia systems and more particularly, an MPEG-4 based multimedia system in connection with a service provider therefor, and a content based remote communication device therefor.

BACKGROUND OF THE INVENTION

It is well known that multimedia devices are versatile as to the ability to process information of various types, e.g., audio programming, television programming, movies, computer games, internet communications, etc., and provide the processed information to a user. However, the processed information may only appeal to a single user, e.g., the user who selected the programming. Other users who are present when the processed information is presented (e.g., displayed or output through an audio system) might prefer other programming or, for example, they might prefer to obtain more information about a particular aspect of the present programming. In addition, it is well known that the control of multimedia devices can be difficult. Most current remote control units play a passive role as they only transmit one-way commands, e.g., to a television receiver, and hence represent a relatively primitive interface between a viewer and a device. Typical multimedia applications include interactive services which require a large number of buttons on remote control units. This is cumbersome and confusing especially because limited space is available on the device surfaces for the buttons/keypad. As the number of multimedia devices increase in the future, the number of corresponding features will also increase making the situation even worse.

Therefore, various companies have come up with new solutions to meet the challenge of controlling modern multimedia equipment. One of these solutions is the PRONTO™ intelligent remote control made by the Philips™ company headquartered in the Netherlands. This remote control unit is a universal learning device, which includes a large touch-screen liquid crystal display (LCD), a virtual keyboard displayed on the LCD, and a two-way infrared (IR) transceiver. The IR transceiver is used to learn codes from other remote control units (RCUs). The Philips™ remote control unit is considered to be an intelligent device because of its adaptive number of virtual buttons. As a result, the user only sees what he/she needs to see for performing a desired function.

The Samsung™ company headquartered in South Korea has taken a further step and makes a two-way remote control unit named IDEO™ that is equipped with a small high-resolution LCD display. The Samsung™ remote control allows for the reception and viewing of television signals on the display in addition to the normal functions of a remote control unit. Thus, while viewing one program on the television, the user can scan, preview, view or select other programs/channels. It should be noted that the source of the video signal shown on the remote control unit display is an external device, e.g., a transmitter included in the television receiver, and such an arrangement requires a second tuner. However, the virtual buttons are internally produced by means of appropriate software and/or hardware.

U.S. Pat. Nos. 6,671,225, 5,861,906 and 5,657,072 show the bi-directional transmission of digital information between a media server and a set-top box which is connected to a television receiver.

U.S. Pat. No. 6,002,450 shows a two way remote control device with an LCD display providing a visual display of selected information such as an advertisement.

U.S. Pat. No. 6,020,881 shows a remote control device having a graphical user interface and has objects which can be selected by the user.

U.S. Pat. No. 6,070,167 shows a hierarchical system for the object based audiovisual tagging of images for, inter alia, manipulation.

U.S. Pat. No. 6,097,441 of Allport shows a system using two or more cooperating but physically independent displays. This patent appears in some ways to be similar to the Samsung™ remote control device discussed above.

U.S. Pat. No. 6,127,941 of Van Ryzin shows a two-way wireless remote control unit including a graphical user interface for controlling various multimedia devices. This and the Philips™ device discussed above have similar remote control features but do not operate in the same manner concerning signal transmission.

U.S. Pat. No. 6,130,726 shows a remote control device with a display for showing a program guide.

U.S. publication No. US2002/0016766 shows the bi-directional distribution of digital content with a service provider.

SUMMARY OF THE INVENTION

As technology rapidly advances, there is a need to further improve both the ability to access multimedia content and the above-mentioned remote control concepts by taking advantage of new technologies. The present inventions are based on two different data encoding formats, e.g., the Moving Pictures Expert Group's MPEG-2 and MPEG-4 multimedia standards. MPEG-4 is a content-based encoding/decoding process and is not block-oriented as is MPEG-2. Hence, MPEG-4 allows for the ability to interact with objects that make up the audio-visual scene. These objects can be audio, visual and audio-visual objects, which can be natural or synthetic, i.e., they can be recorded with a camera, a microphone, or generated by a computer. The data streams of MPEG-4 contain object and scene descriptors that provide configuration and other information for the streams related to interactive audio-visual objects. Thus, the MPEG-4 standard also allows for improved client-server interactivity, which can be realized in the form of downstream and return stream communication channels. This is useful because a downstream data stream may require information to be transmitted upstream from the receiver to the sender, for example, in e-commerce or interactive television.

An MPEG-4 data stream can be embedded and transmitted in the MPEG-2 data stream, and can subsequently be separated from the MPEG-2 data stream, i.e., at the receiver side.

The present invention takes advantage of the above-mentioned features of the two data encoding formats MPEG-2 and MPEG-4, and discloses an interactive remote communication unit having an MPEG4 decoder. The disclosed interactive remote communication unit simplifies and reduces the number of steps required for receiving interactive service. Such a remote communication device also reduces the number of buttons required for operation of the remote since a large number can be confusing to the user. The present invention also discloses new ways for data processing at the provider side.

Interactive digital television services are now considered a key element to introduce digital television services and to encourage customers to invest in new digital television appliances. The present invention discloses improving of the way of exchanging data between the service provider, e.g., broadcaster, cable company, Internet service provider, and the customer (viewer). The present invention also discloses how digital equipment (server, set-top box (STB), remote communication unit and display) involved in the data processing can be modified to optimize the task of controlling the available channel bandwidth and the displaying of data.

DETAILED DESCRIPTION OF THE PREFERRED EMBODIMENT(S)

Figure 1:
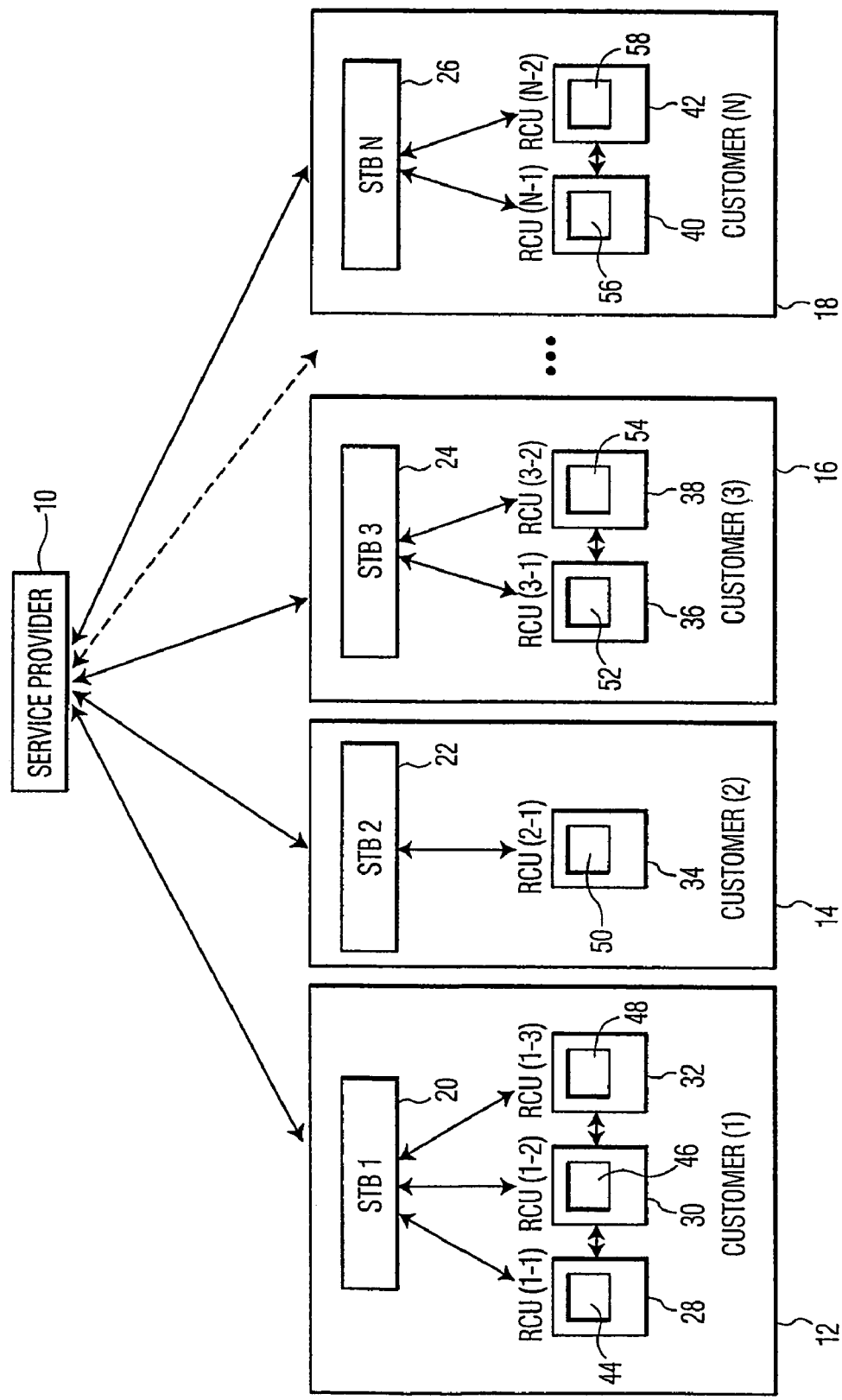
FIG. 1 shows a service provider arrangement for interactive digital television services.

In FIG. 1, a service provider for interactive digital television services 10 often has at least two kinds of data available for (N) customers 12, 14, 16, 18. The data of a main program, e.g., a film, comprises a main event. Additional interactive audio-visual information related to the main program, e.g., short films, is designated herein as "additional audio-visual objects" or simply "additional objects". Because channel bandwidth is limited, the service provider is obliged to optimize the amount of data transmitted per channel. Since the additional objects contain optional information, only a portion of the customers 12, 14, 16, 18 may be interested in receiving the additional objects. Therefore, it would be a waste of channel capacity if the additional objects were transmitted all of the time.

To solve this problem, the present invention, inter alia, discloses that service provider 10 first transmit "the titles" of the additional objects to all the customers and then transmit the actual objects only to the interested customers. A title is defined herein as a short text or an icon that indicates the availability of an additional object. Service provider 10 transmits such a title with its corresponding object code, i.e. the code of the additional object that can be downloaded by customers 12, 14, 16, 18. The title and later the additional object are received and processed by a receiving device, herein typically an integrated receiver-decoder set-top box or simply STB (1) to STB (N) 20, 22, 24, 26.

Another problem is that the customers are confronted with a large amount of data and options that can be difficult to manage. For example, when the additional objects are simultaneously displayed on the same television screen as the main program, they would cover a part of the main picture. There are also other problems that might arise when more people watch the main program and there would be a plurality of displays overlaid on the main picture. Additionally, usually not all of the viewers would want to view the additional objects.

To solve these problems, inter alia, a two-way RCU 28, 30, 32, 34, 36, 38, 40, 42 with respective displays 44, 46, 48, 50, 52, 54, 56, 58, which may, for example, be touch-screen displays, is disclosed with bi-directional communication between the STBs and RCUs. When STB 20, 22, 24, 26 receives a program including a title, STBs 20, 22, 24, 26 separate the title from the main program and transmit the title to respective RCU 28, 30, 32, 34, 36, 38, 40, 42. The title is transmitted to the RCUs via a communications medium, such as a wired connection (e.g., a bus or network connection) or a wireless connection (e.g., an RF or infrared wireless connection, such as a wireless network or home network connection) and is received via a signal receiving means included in the RCU, e.g., included in transceiver 88 shown in FIG. 3. RCUs 28, 30, 32, 34, 36, 38, 40, 42 then display the title on its respective display 44, 46, 48, 50, 52, 54, 56, 58 and no title appears on the main television display. One touch on a title appearing on the touch-screen display or, for example, activation of an appropriate button or switch on the RCU, suffices to activate transmission of a message to the respective STB for the purpose of ordering the additional object. This is accomplished by the respective RCU 28, 30, 32, 34, 36, 38, 40, 42 transmitting a message back to respective STB 20, 22, 24, 26 via a second transmission medium, e.g. wired or wireless, that may be the same or different as the first medium used to receive the title from the STB (e.g., messages could be sent both directions via a wireless RF communication channel or, alternatively, the title could be sent to the RCUs via an RF communication channel (or via a wired home network connection) and messages could be sent from the RCU to the STB via an infrared wireless protocol. The transmission from the RCU to the STB occurs via a transmission means that may, e.g., be included in transceiver 88 shown in FIG. 3. A transmission means as referred to herein may also be viewed as including a portion of the touch screen display or RCU control system that when activated by a user enables or causes generation and transmission of such a message from the RCU to the STB. This message from the RCU to the STB is designated herein as a "title request message". STB 20, 22, 24, 26 processes the "title request message" and transmits the code of the desired object back to service provider 10 via a return channel. The return channel may or may not be the same medium as the downstream channel. For example, the downstream channel can be a satellite channel and the return channel can be, e.g., a satellite channel, an Internet channel, a cable channel etc.

As shown in FIG. 1, a customer might have more than one RCU, for example customer (1) has three RCUs, specifically RCU(1-1) 28, RCU(1-2) 30 and RCU(1-3) 32. As will be discussed later according to aspects of the present invention, every RCU 28, 30, 32, 34, 36, 38, 40, 42 has its own identification code and can be individually addressed by its respective STB 20, 22, 24, 26. As a result, an additional object can be displayed on RCU(1-1) 28 while RCU(1-2) 30 completely ignores that object. When more than one RCUs are available to the customer, then these RCUs also communicate with each other to prevent simultaneous data transmission to the respective STB 20, 22, 24, 26.

Figure 2:
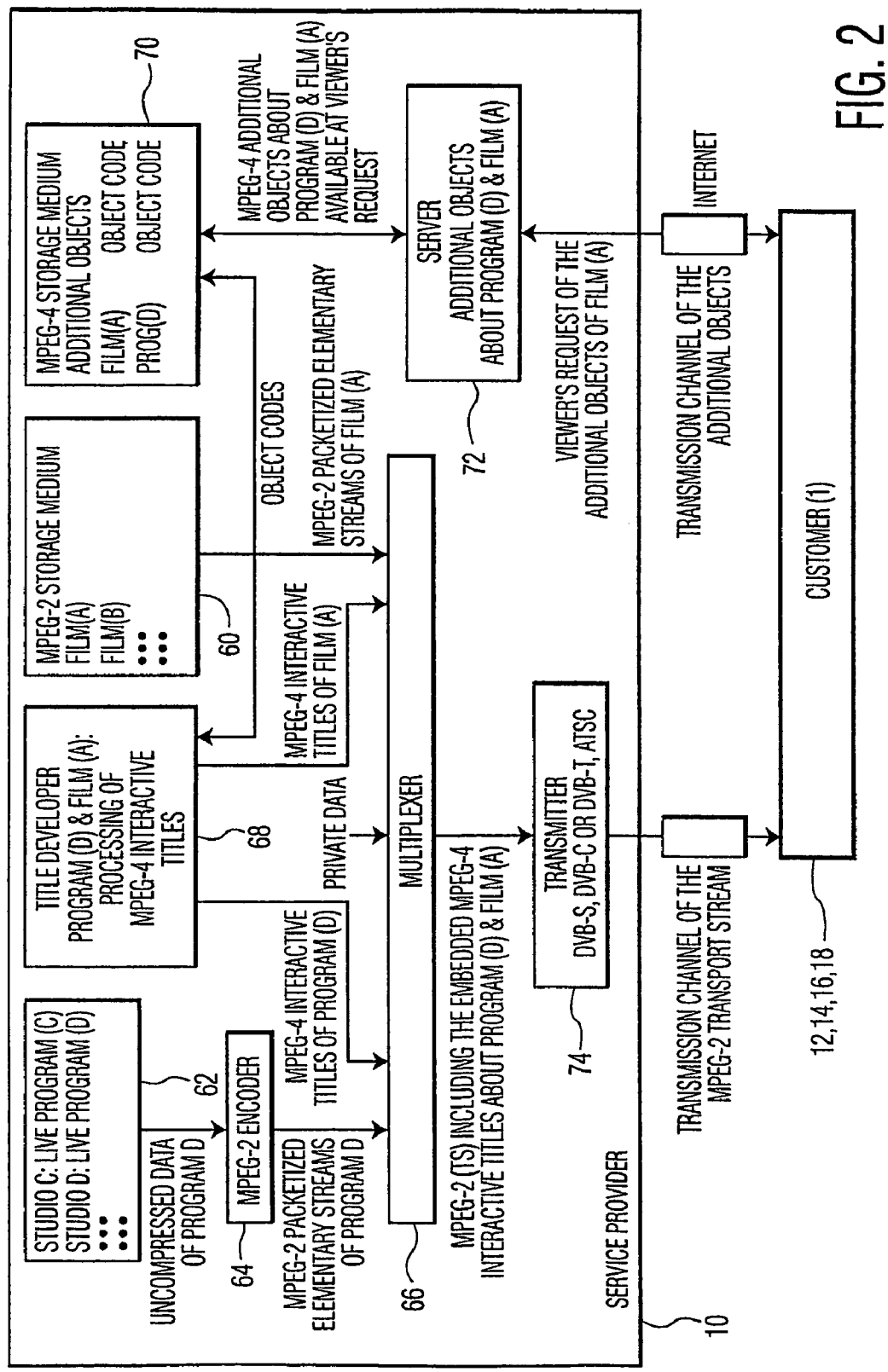
FIG. 2 is a block diagram that shows how the service provider prepares the titles and the additional optional audio-visual objects of different programs.

FIG. 2 is a block diagram that shows how service provider 10 prepares the titles and the additional optional audio-visual objects of the different programs. The current main programs, e.g., film (A) and film (B), are stored in MPEG-2 storage medium 60, and live program (C) and live program (D) are provided at 62. It is assumed for the simplicity of discussion that only film (A) and live program (D) are each provided with one additional object but obviously any and all items can be provided with a plurality of additional objects.

The uncompressed audio-visual digital signal of the main live program (D) is coupled to and processed by an encoder for encoding data in a first format, e.g., MPEG-2 encoder 64, in a manner known in the art. The compressed MPEG-2 packetized streams at the output of MPEG-2 encoder 64 are applied to a multiplexer 66. Similarly, the MPEG-2 packetized streams of film (A) are transferred from storage medium 60 directly to multiplexer 66 since film (A) is already stored in MPEG-2 compressed encoded form to reduce memory space. Thus, the described MPEG-2-related signal handling and processing features comprise an exemplary embodiment for providing or generating one or more main events or programs in the form of a main data stream.

A "title developer" 68 produces the titles for the additional objects, which will be provided along with the main programs (A) and (D). Service provider 10 distributes the generated titles to all the customers from customer(1) 12 through customer(N) 18. The titles are produced by an encoder encoding data in a second format, e.g., in an MPEG-4 encoded form at 68, by using software tools known to those skilled in the art. According to the exemplary embodiment, a title not only contains a short description about the object to be downloaded, but it also contains an identification code of this object. The produced title is applied as an MPEG-4 data stream to multiplexer 66, where it is embedded in the corresponding MPEG-2 packetized streams of, e.g., film (A) and live program (D). The described MPEG-4-related signal handling and processing features comprise an exemplary embodiment for generating or providing a data stream in addition to the main data stream, i.e., an additional data stream.

Finally, some of the service provider's private data can also be applied to multiplexer 66. Service provider 10 determines the content of the private data, which among other things, can include the address of a server 72. This address can be used by STB 20, 22, 24, 26 to send back a message to server 72 via a return channel, as will be discussed later. Thus, the resulting data stream at the output of multiplexer 66 is an MPEG-2 transport stream that can include, e.g., film (A), an MPEG-4 embedded title of film (A), a live program (D), an MPEG-4 embedded title of live program (D), and private data from service provider 10.

Additionally, it is also desirable that service provider 10 only transmit a title of an object while the corresponding event is still being transmitted, for example, as long as film (A) is being transmitted. This is because service provider 10 initiates new titles and new objects for subsequent events.

The data stream is coupled to a transmitter 74, where it is modulated and transmitted to customers 12, 14, 16, 18. Prior to the actual data transmission, there are some required modulation and signal processing steps that are not relevant to the present invention, and therefore, except for the immediate following listing, will not be further discussed herein. The modulation and signal processing steps for transmission will depend upon whether the signal is transmitted via satellite, cable or terrestrial, with the contemporary technical standards being, e.g., the DVB-S (Digital Video Broadcasting-Satellite) standard, the DVB-C (Digital Video Broadcasting-Cable) standard, the DVB-T (Digital Video Broadcasting-Terrestrial) standard, the ATSC (Advanced Television Systems Committee) standard, and the DAB (Digital Audio Broadcasting) standard.

Figure 3:
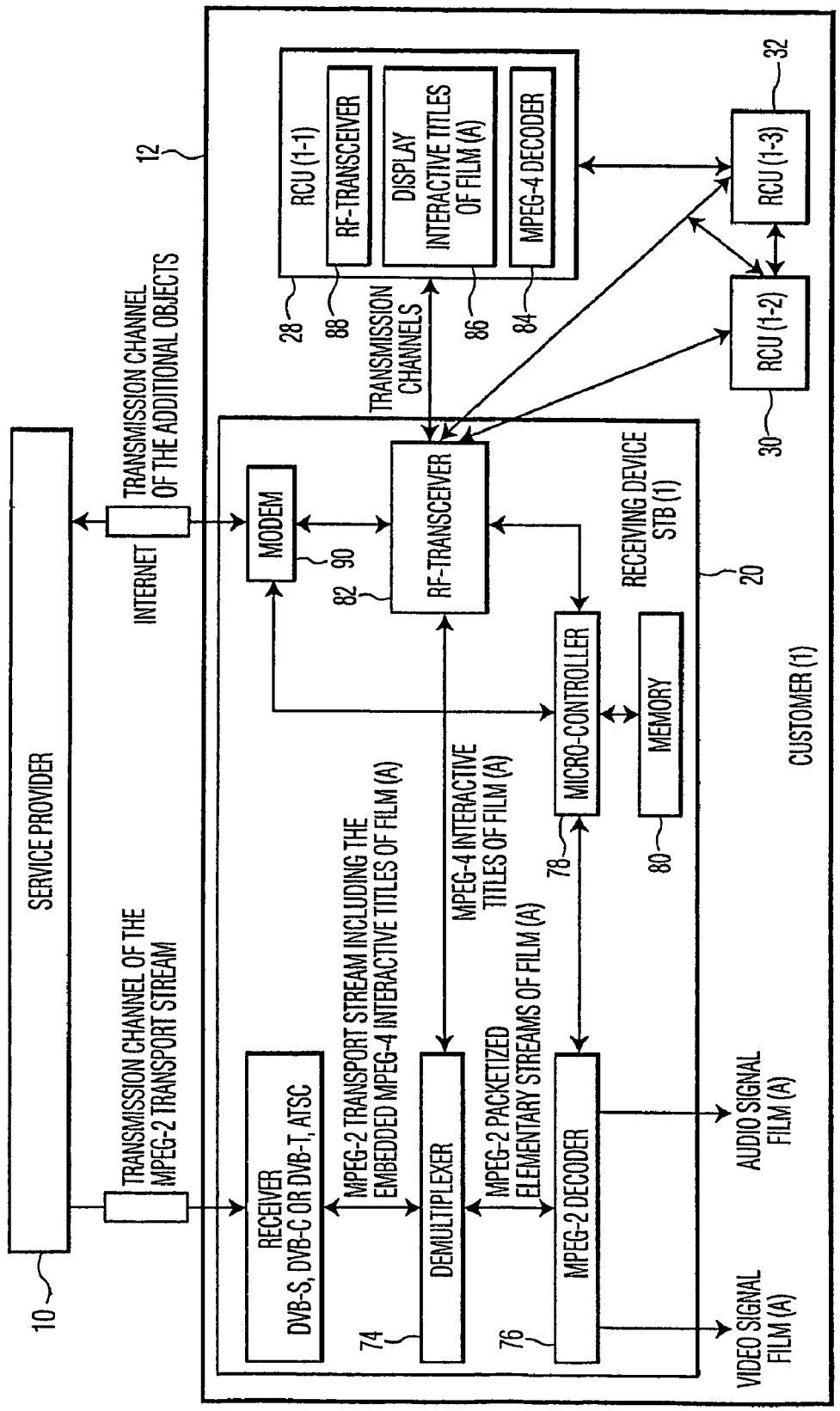
FIG. 3 shows a block diagram of the customer side of FIG. 2.

In FIG. 3, the customer side 12, 14, 16, 18 of FIG. 2 is shown, e.g., customer (1)12 with STB(1) 20 and three RCUs, RCU(1-1) 28, RCU(1-2) 30 and RCU(1-3) 32. Every RCU 28, 30, 32 has a unique identification code that is stored in a memory in the corresponding RCU 28, 30, 32. STB(1) 20, RCU(1-1) 28, and/or RCU(1-2) 30 and RCU(1-3) 32 together comprise a multimedia system, in which the three identification codes of the RCU 28, 30, 32 are known and stored in a memory 80 of STB 20. As used herein, a remote communication unit, or an RCU, is envisioned as encompassing various forms and functions. For example, an RCU may provide for communicating with a service provider via a STB, e.g., for interactive services, such that the STB links the RCU to the service provider. An RCU may provide for displaying content received from an STB, e.g., in the form of MPEG-4 data that the STB separated from a combined MPEG-2/MPEG-4 data stream received by the STB. An RCU may provide for controlling the STB, for example, by providing control functions typically provided in a remote control. An RCU may provide for both interactivity and STB control or may provide minimal or no STB control functions such that the reception and transmission of information via the STB is transparent to a user of an RCU. An RCU may be handheld, e.g., similar to a typical remote control or a personal digital assistant (PDA), or an RCU may be a larger device having a larger display, e.g., similar to a laptop computer.

Referring again to FIG. 3, in STB(1) 20, the received and demodulated signal is an MPEG-2 data stream that is applied to an input of demultiplexer 74. The exemplary data stream contains, as stated above, e.g., film (A), an MPEG-4 embedded title of film (A), live program (D), an MPEG-4 embedded title of live program (D) and private data of the service provider 10.

Assume for the purposes of the following discussion, that the viewer for STB(1) 12 selects to watch film (A). As a result, demultiplexer 74 demultiplexes the audio and video packetized streams of film (A) and ignores the streams of live program (D). The output of demultiplexer 74 is applied to an MPEG-2 decoder 76, which decodes the signal into the corresponding audio and video signals and hence film (A) appears on the color television (CTV) (not shown in FIG. 3). Demultiplexer 74 also detects and extracts the MPEG-4 embedded data stream from the MPEG-2 data stream. Particularly, the MPEG-4 data stream contains the title of the additional object related to film (A). At this point and before transmitting the MPEG-4 data to RCU 28, 30, 32, microcontroller 78 creates a table designated herein as the "additional object table". This table provides the information needed for handling the requested object in a proper interactive way between the viewer and service provider 10.

The "additional object table" table can contain the following data:

1—The object identification code that the service provider transmits with the corresponding title.
2—Film (A) or event identification code which is included in the MPEG-2 transport stream.
3—The current program (channel) identification code which is included in the MPEG-2 transport stream.
4—The address information about where to send back messages to the service provider via a return channel. This address might be included in the private data or in the service information provided by the service provider.
5—The RCU identification code(s) of the interested viewer(s). This is not known at the moment.

All the information but the RCU identification code are known and can be readily stored in the "additional object table" in memory 80 of STB 20. Under the control of microcontroller 78, the three identification codes of the available RCUs and the separated MPEG-4 title are transmitted via an RF-transceiver 82 to all of the remote communication units RCU(1-1) 28, RCU(1-2) 30 and RCU(1-3) 32. The RCUs that receive and identify their own identification codes, here RCU (1-1) 28, RCU (1-2) 30 and RCU (1-3) 32, decode the message using their respective microcontrollers (not shown in FIG. 3) and respective MPEG-4 decoders 84. RCUs 28, 30, 32 also store the received object identification codes and display the title on their respective touch-screen displays 86. Thus, viewers can watch film (A) on the CTV and see the title, i.e. the received title of the additional object of film (A) on the display 86 of their RCUs.

Assume that only the viewer with RCU(1-1) 28 chooses the displayed title by touch pressing the title on display 86 while the other viewers were not interested. In accordance with aspects of the present invention, a "title request message" is only generated by the RCU of the interested viewer, here RCU(1-1) 28. The "title request message" includes the object identification code of the selected title and the identification code of RCU(1-1) 28. The RCU transmits the "title request message" to RF-transceiver 82 of STB 20 via its own RF-transceiver 88. With the aid of the received object identification code, microcontroller 78 of STB 20 recognizes the "additional object table" and adds the received RCU identification code to the table, i.e. adds exactly to the same group of codes for the desired object.

The "additional object table" is now complete. Microcontroller 78 then compares the code of the current received event in the MPEG-2 transport stream, along with film (A), with the code of film (A) being in the "additional object table". Both codes are identical when film (A) is still the received event. Microcontroller 78 then sends an "object request message" to the service provider 10 via the Internet or another return channel, e.g. the same medium as the downstream channel, using modem 90.

The server address of the service provider 10 is included in the private data as discussed before. The "object request message" includes the object identification code and the set-top address, e.g. the Internet address.

Since the data exchange between the RCU and the STB takes place locally, i.e., at home, the transmission protocol can be freely determined by the producer of STB 20. For example, a protocol similar to a typical remote control protocol might be used, e.g., for control information, and/or other protocols such as a high-speed data network communication protocol might be used for program content and/or control information. In addition to the exemplary embodiment described herein utilizing wireless RF communication between the RCU and STB, wired communications may also be used rather than, or in addition to wireless communication. If a network protocol is used, the RCU and STB may also communicate with other devices, e.g. other multimedia devices such as an audio system, a video program source (VCR, DVD, etc.), in addition to communicating between the STB and RCU. On the other hand, the transmission protocol used between the STB and service provider 10 depends on the medium used for the return channel and is not part of the present invention.

Of course, other viewers may also be interested in receiving the same object, for example, in FIG. 1 the viewer with RCU(3-2) 38 at customer (3), and the viewer with RCU(N-2) 58 at customer (N). At service provider 10, (see FIG. 2), the object code and the STB addresses of all the interested viewers are collected and processed in server 72. Server 72 fetches the required object from the MPEG-4 storage medium 70 by means of the received object code. In storage medium 70, this data is stored in MPEG-4 encoded form to reduce memory space. Server 72 transmits the object, including its identification code, to the corresponding customers via the downstream channel.

It should be noted that users of the various RCUs can view objects in a "time shift mode". Assume that there are at least two RCUs (A) and (B) communicating with the same STB. The STB transmits a title to both RCUs (A) and (B) with the title being simultaneously displayed on the RCU displays of RCUs (A) and (B). A viewer with RCU (A) can select (press) the title on the display of RCU (A) at, e.g., 10:00 o'clock, receives the object at 10:01 and starts to watch the requested object. A viewer with RCU (B) selects (presses) the same title on the display of RCU (B) at 10:05 o'clock, receives the same object at 10:06 and starts to watch the requested object. Assume further that the duration of the selected object is longer than the five minute time difference between the starting time of watching the same object on the respective RCUs. In such a case, the viewer with RCU (B) watches the object in a time shift mode relative to the viewer of RCU (A).

In FIG. 3, microcontroller 78 in STB 20 compares the MPEG-4 received object code with the object code in the "additional object table" to get the corresponding RCU identification code of the interested viewer, here RCU(1-1) 28. Microcontroller 78 then transmits the RCU identification code and the actual object via RF-transceiver 82 to the RCU. Since only the identification code of RCU(1-1) 28 matches the received identification code, RCU(1-1) 28 decodes and displays the object related to film (A) on its display 86, with RCU(1-2) 30 and RCU(1-3) 32 ignoring the received message. The displayed object is related to film (A) which is displayed on the CTV.

Thus, from the above, it should be clear that at the beginning of a new offer from service provider 10, all the viewers receive a small amount of additional data, namely the title. Later, only the interested viewers receive the larger amount of additional data of an actual object which can be a video signal with sound, e.g., a short subject film. Meanwhile, film (A) is being watched on the CTV without any disturbance caused by extra windows that would cover the main picture, as would be the case of, e.g., a picture-in-picture feature commonly known as PIP, which also requires a second tuner. As shown in FIG. 2, the title of the additional object is embedded in the data stream of film (A), so that when film (A) ends, the transmission of its corresponding title also ends.

At the end of film (A), when the transmission of the title stops, a customer can be in one of the following situations:

A) An uninterested viewer who simply ignored the displayed title or has already deleted it. This viewer is not effected at the end of the film.

B) A viewer has already downloaded the object of interest. This viewer is also not effected.

C) A viewer is in the middle of downloading the object. This viewer is also not effected because, in the present embodiment, server 72 of service provider 10 continues to deliver the complete object.

D) A viewer requested an object after the film has finished. If this viewer tries to download the object by pressing the title, a "title request message" is generated and transmitted to STB 20 as explained above. Microcontroller 78 checks the present status of Film (A). The status is either "event is currently running" or "event has already finished". The information about the present status can be determined by comparing the corresponding data in the MPEG-2 transport stream and the event code of film (A) stored in the "additional object table". When STB 20 compares both codes, then the codes will not be identical and the current event status will be "event has already finished". This status is however true if the viewer did not change the program while watching the film. It is therefore necessary to check the status of the current program. Microcontroller 78 compares the current program code with the program code stored in the "additional object table". Since the viewer did not change the program, both codes will be identical. The result of the comparison is that the film has definitely finished.

As a result, microcontroller 78 returns a "not available message" to the corresponding RCU and this message is displayed on respective display 86. The "not available message" is useful because it informs the viewer that the displayed title is superfluous, i.e, not needed any more, and should be deleted.

Since the number of the remaining displayed titles can grow with time, it would be helpful for the viewer if the deletion of the unnecessary titles would take place in a more efficient and automatic manner. It is therefore desirable that the deletion of the titles can be achieved by one or more of the following possibilities:

1) The viewer can delete a title any time in a conventional way by highlighting a title and choosing delete from a menu.

2) The viewer can delete a title after receiving a "not available message" as explained above.

3) The viewer can delete all superfluous titles by choosing the option "refresh display" from a menu. The refresh display command automatically generates a "titles request message" for every displayed title. All of the "title request messages" are successively transmitted to STB 20 and checked for their availability. Depending on the result, STB microcontroller 78 sends a delete command to the corresponding RCU. By doing so, all superfluous titles are automatically deleted in seriatim.

4) Full automatic deletion of superfluous titles can also be achieved by every time a user presses a title of interest, that a "refresh display" command is automatically activated.

5) A viewer has changed the program before pressing the displayed title, i.e. although the event film (A) is not yet finished, another program has been selected. In such an event, the RCU generates a "title request message" and transmits it to STB 20. STB 20 compares the current event code, (not film (A)), with the film (A) code in the "additional object table", where both codes are not identical. When this happens, microcontroller 78 compares the current program code with the program code in the "additional object table". Since the viewer did change the program, the codes will not be identical. In this case, microcontroller 78 sends a message "Switch back to the desired program (Yes/No)?", which will be displayed on display 86 of the RCU. If the viewer chooses the "yes" option, then STB 20 automatically switches back to the program of film (A). This is possible since the program code is stored in the "additional object table" as explained above. Then, microcontroller 78 checks the current event status to find out if film (A) is still running. If both codes are identical, then microcontroller 78 transmits the desired object code and STB 20 address to service provider 10. If the program codes are different, then a "not available" message is transmitted to the corresponding RCU. On the other hand, if the viewer chooses the "No" option, then STB 20 ignores the "title request message".

Figure 4:
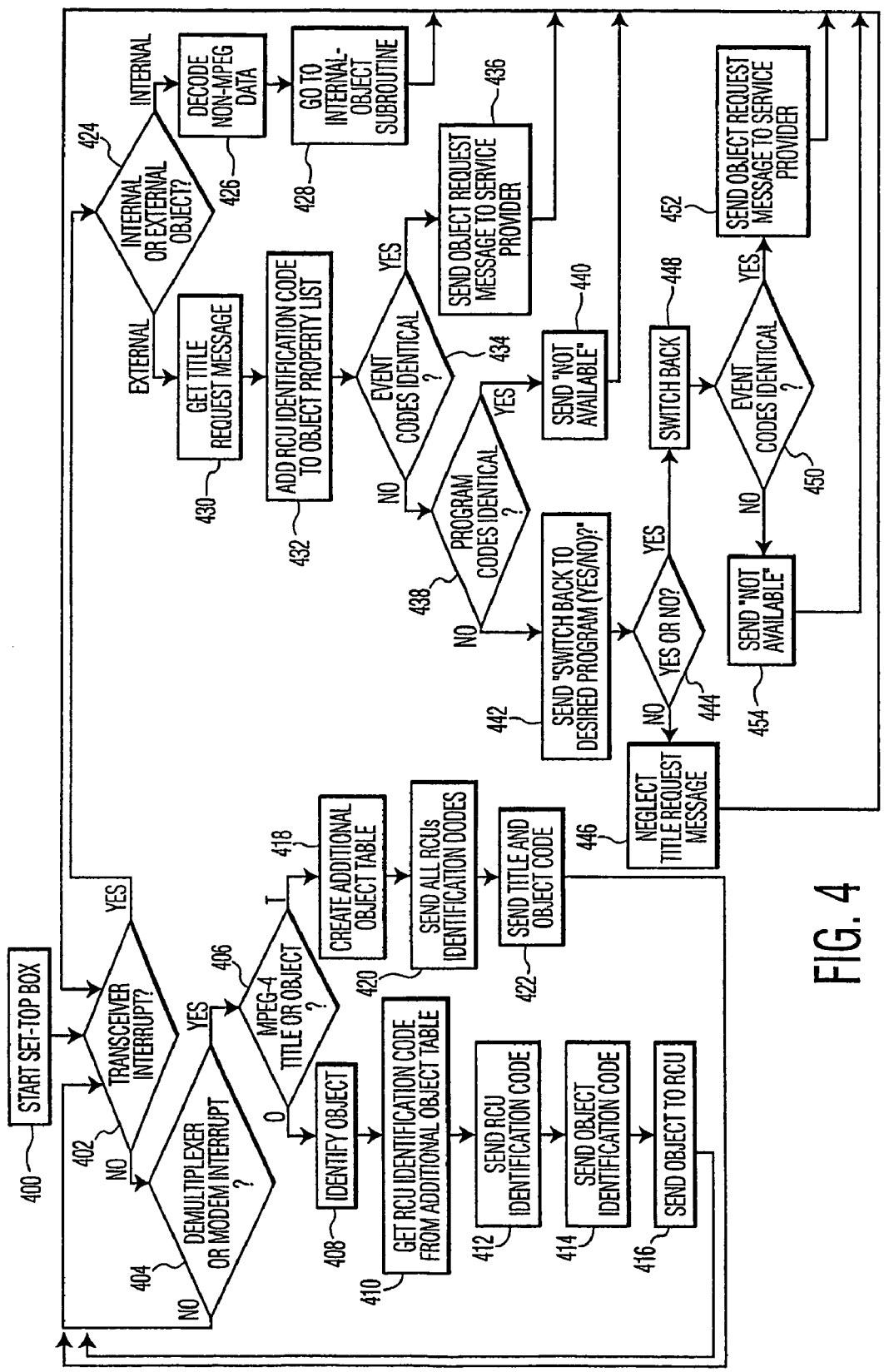
FIG. 4 shows a flow chart of the processing algorithm for the set-top box of FIG. 3.

The processing algorithm for the STB is shown in the flow chart of FIG. 4. The flow chart of FIG. 4 contains only the main steps required for understanding aspects of the present invention.

Starting at STB block 400, a determination is made at 402 whether there was a transceiver interrupt. If the determination is NO, then a decision is made at 404 as to whether there was a multiplexer or modem interrupt. If NO, then go back to 402. If YES, then there is a determination at 406 whether it is an MPEG-4 title or an object. If it is an object, then the object is identified at 408, the RCU identification code is gotten from the additional object table at 410, the RCU identification code is sent at 412, the object identification code is sent at 414, the object is sent to the RCU at 416, and a return is made to 402.

If the determination at 406 is that the data is an MPEG-4 title, then an additional object table is created at 418, all RCU identification codes are sent at 420, the title and object codes are sent at 422, and a return is made to 402.

If the determination at 402 is YES, that it is a transceiver interrupt, then a determination is made at 424 whether it is an internal or external object. If the determination is that the data is an internal object, then the non-MPEG data is decoded at 426, and the internal object subroutine is invoked at 428 with a return to 402.

If the determination at 424 is that the data is an external object, then a title request message is provided at 430, the RCU identification code is added to the object property list at 432, and a determination is made at 434 whether the event codes are identical. If the determination is YES, then an object request message is sent to the service provider at 436 with a subsequent return to 402.

If the determination at 434 is NO, that the event codes are not identical, then a determination is made at 438 whether the program codes are identical. If the decision is YES, then a "not available" message is sent to the RCU at 440 with a subsequent return to 402.

If the determination at 438 is NO, that the program codes are not identical, then the message "switch back to desired program (yes/no)" is sent to the RCU at 442 and a determination is made at 444 depending upon the received response to the message at 442. If the response is NO, then the title request message is neglected at 446 with a return to 402. If the returned response is YES, then there is a switch back at 448 for a decision at 450 of whether the event codes are identical. If the determination at 450 is YES, then an object request message is sent to the service provider at 452 with a return to 402. If the determination is NO that the event codes are not identical, then a "not available" message is sent at 454 and a return is made to 402.

Figure 5:
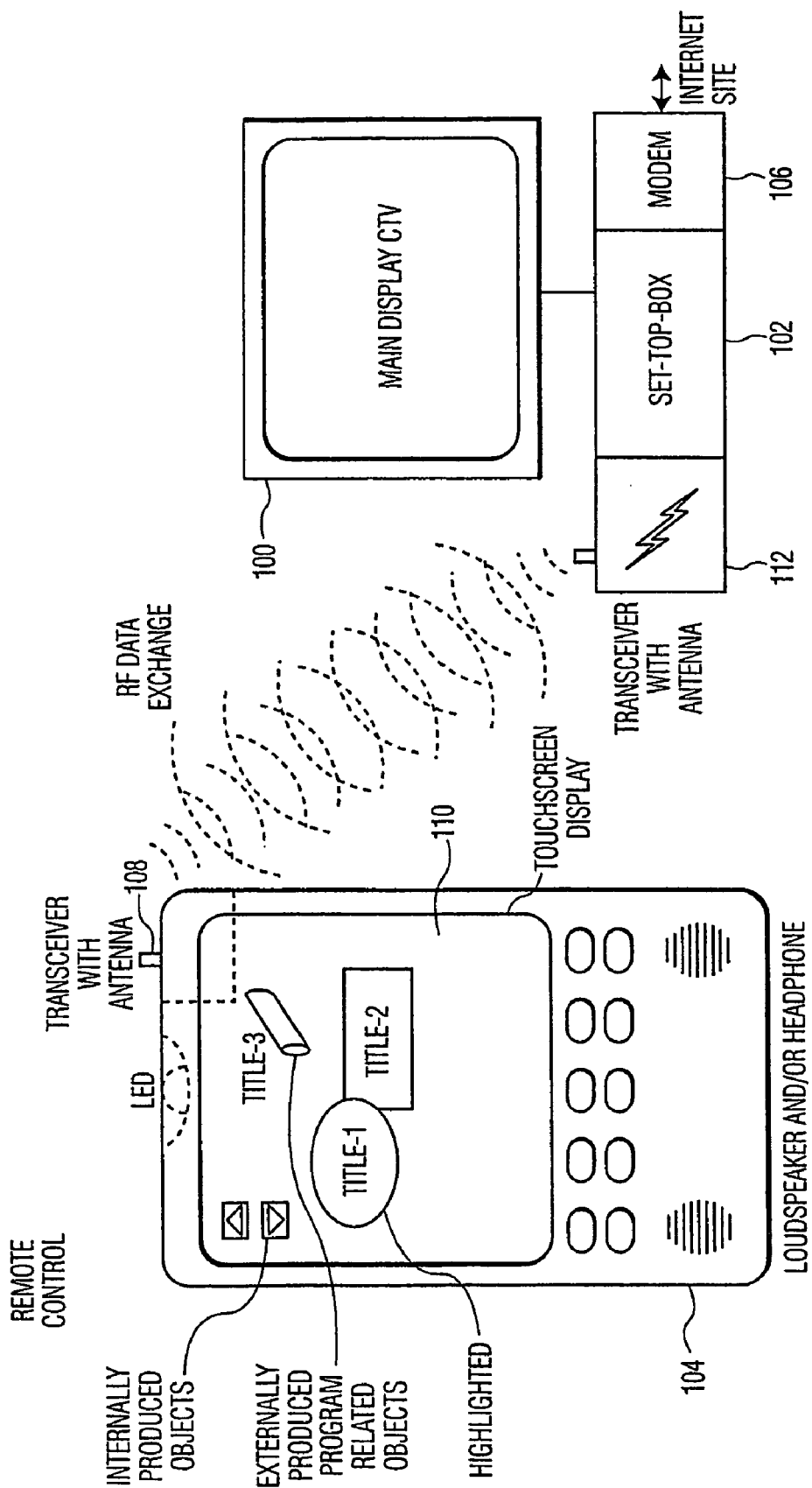
FIG. 5 is a diagram of a representative multimedia system.

The system of FIG. 5 includes a CTV set 100, an STB 102 and a two-way RCU 104 with the Internet being used as the return channel. Therefore, STB 102 is connected via a modem 106 to an Internet site. RCU 104 includes an RF-transceiver 108 with an antenna for performing the appropriate processing operations for transmitting and receiving radio frequency (RF) signals to and from STB 102, in a manner known in the art. Additionally, RCU 104 and STB 102 might include an infrared (IR) transmitter/transceiver (not shown) in place of the RF transceivers discussed herein, for wireless communication between an RCU and STB, in a manner known in the art. Another alternative is that the STB and RCU could be connected by, and communicating via, a wired or wireless network to which other devices, e.g., one or more of a home audio system, personal computer, display device, DVD player, etc., might also be connected. Also as described herein, a system may include multiple RCUs that can communicate with the STB, with the service provider and with each other via one or more of the described communication mediums.

Further RCU 104 is provided, for example, with a touch-screen graphical user interface, for example, an LCD 110, which is also suitable for displaying video. In one mode of operation, RCU 104 operates in a conventional way, i.e. the displayed data represent commands as issued by the user to control various functions, using internally produced virtual buttons/icons appearing on the touch-screen display. STB 102 includes a second RF-transceiver 112 with an antenna. Second RF-transceiver 112 is substantially identical to first RF-transceiver 108 of the RCU 104 and performs the same functions of transmitting and receiving information carrying signals.

As can be seen on display 110 of RCU 104, in addition to the internally produced icons, there are an arbitrary number of titles, which are designated here as Title-1, Title-2 and Title-3. All or a part of the titles may relate to the current event, the rest can be superfluous. The user can download the corresponding object(s) in an interactive way by pressing a title on the touch-screen display. As a result, the selected title might be highlighted, as is shown in FIG. 5 for Title-1.

Figure 6:
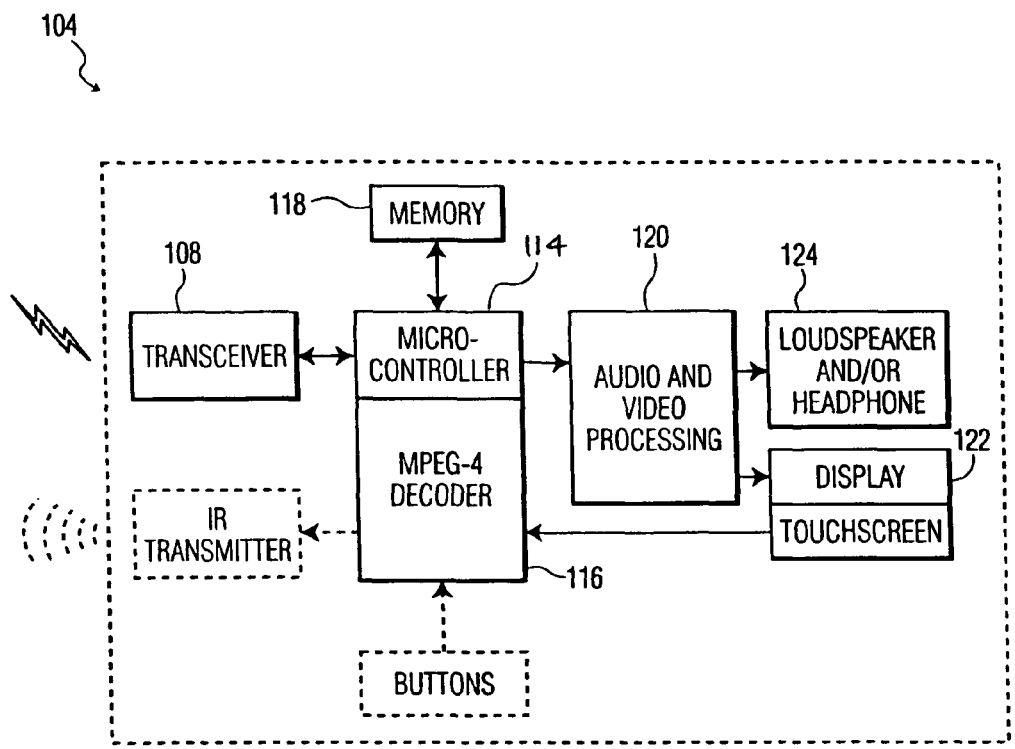
FIG. 6 shows a block diagram of the remote communication unit of FIG. 5.

FIG. 6 shows a simplified block diagram that represents the signal processing in RCU 104 according to aspects of the present invention. It is understood that various other components are included in the RCU to carry out different operations. However, for simplicity, the illustration of these components is omitted as being non-essential to the understanding of the present invention. It should also be noted that the IR transceiver in the RCU and the IR transceiver in the STB are optional and could be removed if RF transceivers 108, 112 are used to send conventional control commands. Alternately, the RF transceivers can be removed if the IR transceivers used also transmit MPEG data.

In FIG. 6, the received and demodulated MPEG-4 data streams at the output of the RF-transceiver are applied to a microcontroller 114 and an MPEG-4 decoder 116. The decoding process requires a memory 118 for data storage. The decoded MPEG-4 digital audio and digital video signals are further processed in an audio-video processing circuit 120 in a manner known in the art, which further functions in a manner known in the art, as an interface to a LCD touch-screen display 122 and loudspeakers 124, which can be used when display 122 displays a requested video object. RCU 104 also receives and decodes non-MPEG data from STB 102.

Up to this point, the object request messages and the actual additional objects are transmitted mainly via, e.g., the Internet. The advantage of using the Internet as a return channel is to reduce the amount of data payload in the main transmission channel, e.g., a satellite channel. The disadvantage of this approach is that the additional information has to be sent as many times as the number of interested customers. Thus, it is also an aspect of the present invention to consider return channels other than the Internet.

The return channels can be the same medium as the downstream channel, e.g., using cable, satellite or terrestrial channels. These return channels are defined in the standards discussed above. In the event that the service provider uses the same medium for the downstream and the return stream, then the amount of the main and the additional data should be optimized for that particular return channel. In accordance with aspects of the present invention, the titles of the additional objects are transmitted in the same manner independent of the medium of the return channel, i.e. embedded as MPEG-4 encoded data in the MPEG-2 packetized data streams of the main program. However, the desired object codes of the different customers can be transmitted back to the service provider via the same medium as the downstream data or any other appropriate return channel.

Figure 7:
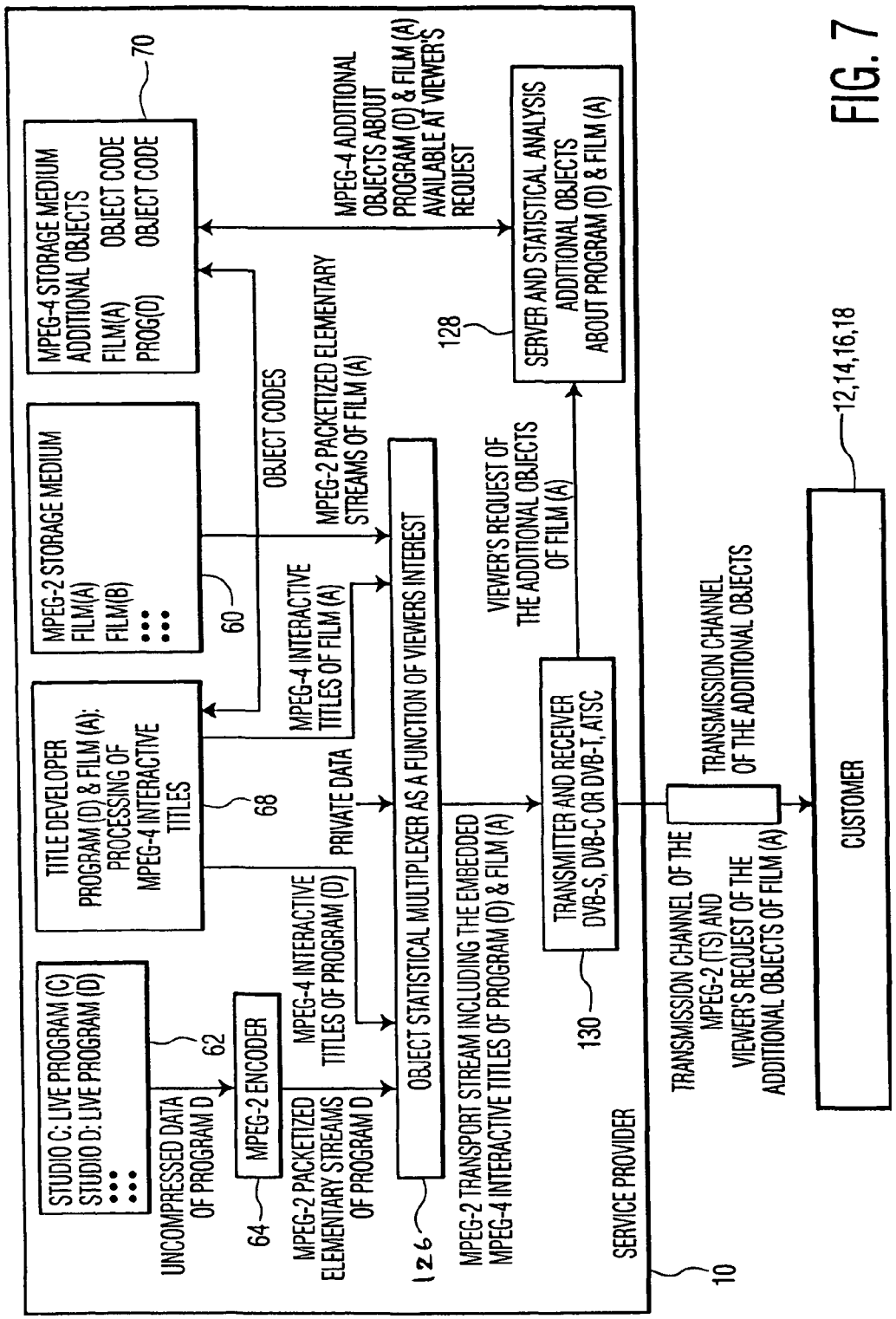
FIG. 7 shows a block diagram of the service provider of FIG. 2 using statistical gathering of information.

On the service provider's side, the received messages are continuously sorted and counted separately for every object code, to calculate the statistical distribution of customers' requests. The result will show how many customers are interested in which object. This result is then used by, e.g., a statistical multiplexer 126 shown in FIG. 7, before sending the actual additional objects. It is of course to be understood that the exemplary embodiment uses a stastical multiplexer but that there are other equivalent ways of developing a statistical distribution, e.g., in the software of multiplexer 66, or other equivalent devices, all being commonly available. As a result, the more customers that are interested in receiving one of the additional audio-video objects, the more data space for this particular object is made available. The statistical distribution of the incoming messages is also valuable information about the present interest of the viewers and this is performed by server 128. With the aid of this information, the service provider can improve the quality of the additional objects and reduce/add to the bandwidth used. In this embodiment, bi-directional communication is performed by transmitter/receiver 130 using the downstream channel for the return channel. Except for the statistical gathering functions shown in FIG. 7, FIG. 7 includes many of the same members as FIG. 2 and such members are similarly numerically designated as in FIG. 2.

Figure 8:
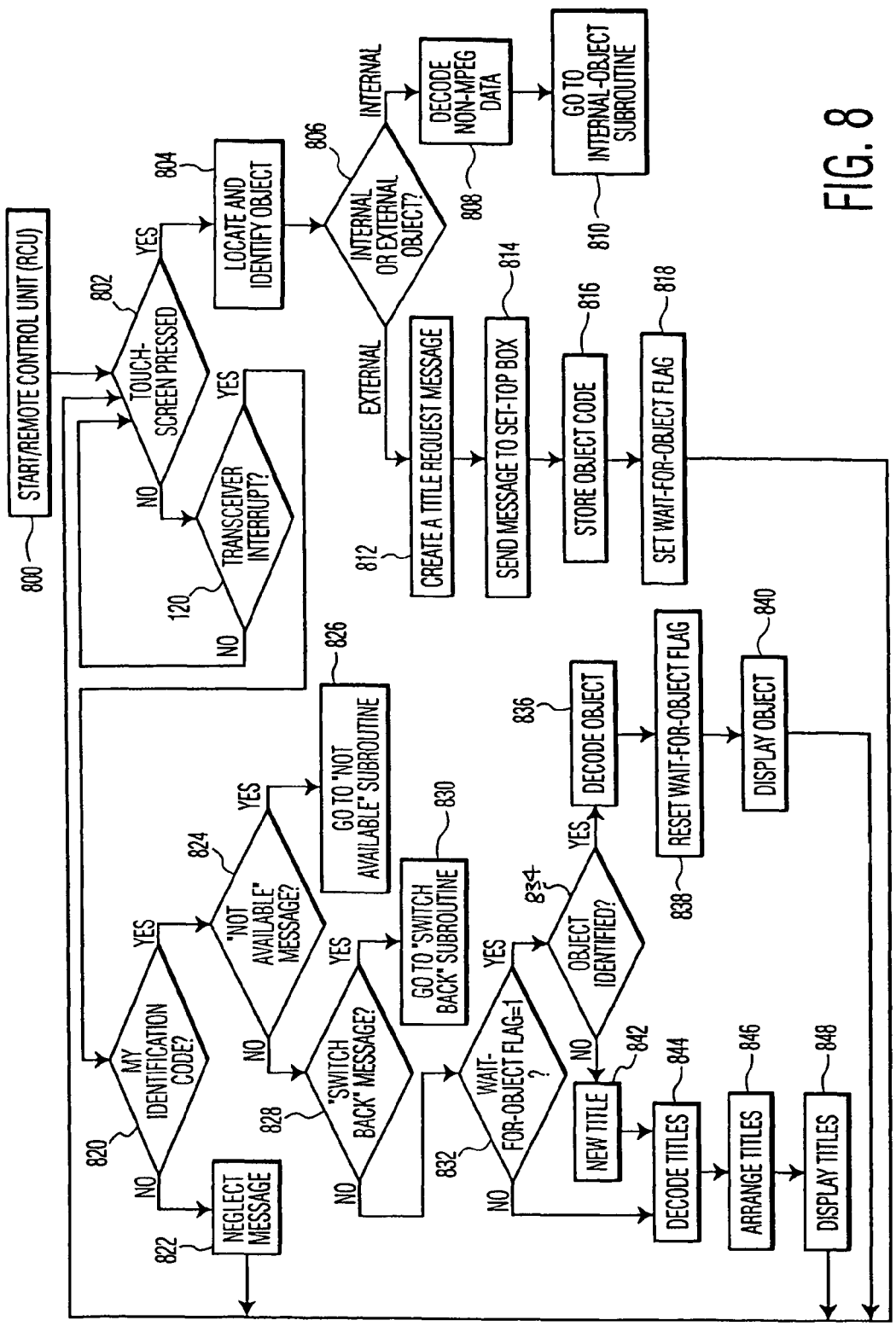
FIG. 8 shows a flow chart of the operation of a remote communication unit of FIGS. 5 and 6.

The processing algorithm for an RCU 800 is shown in the flow chart of FIG. 8. The flow chart shows only the functions required for understanding aspects of the present invention.

Microcontroller 114 (FIG. 6) scans the input signal of the touch screen display 122 (FIG. 6). If the viewer presses an object on the screen at 802, then microcontroller 114 locates and identifies the object at 804. There are two possibilities; the object can be internal or external at 806. An internal object is an object that is factory-set and independent of the titles provided by service provider 10. Such internal objects are used to control the basic functions of multimedia devices, e.g., loudness or channel selection in a manner known in the art and will not be further discussed herein. In such an event, the non-MPEG data is decoded at 808 with an exit to an internal object subroutine at 810.

An external object is a title that is received from service provider 10. If a displayed title is pressed on the touch-screen display at 802, then microcontroller 114 creates and transmits a "title request message" at 812, a message is sent to the STB at 814 which stores the object code of the desired object in memory 118 (FIG. 6) at 816. Additionally, microcontroller 114 sets a bit in a register at 818 (not shown) designated as a "wait-for-object" flag. When this flag is set, then microcontroller 114 "knows" that the viewer has requested an object from the service provider 10 and there is a return to 802.

When the STB 20 transmits a message to RCU 800, transceiver 108 FIG. 6) sends an interrupt signal to microcontroller 114 of RCU 800 at 120. Microcontroller 114 checks at 820 if the message contains its own RCU identification code before proceeding with the decoding process. If it is a different identification code, then the message is ignored at 822 with a return to 802. If the identification code is correct, then the presence of a "not available" message is checked for at 824. If there is such a message, then the "not available" subroutine is entered at 826.

If there is no "not available" message, there a check is made for a "switch back" message at 828. If there is such a message, then a "switch back" subroutine is entered at 830. If there is no such message, then the "wait-for-object" flag is checked for at 832. A "wait-for-object" flag that is set means that the RCU is waiting for a requested object, which the object code has been stored in memory 118 of RCU 800. Microcontroller 114 compares the received object code with the stored object code at 834 and if they are the same, then microcontroller 114 decodes the received object data at 836 using MPEG-4 decoder 116 (FIG. 6), and resets the "wait-for-object" flag at 838. The received object is then displayed at 840 on display 122 (FIG. 6) with a return to 802.

On the other hand, if the received object code and the stored object code were not the same, then microcontroller 114 deals with a new object, i.e. a new title at 842. If the "wait-for-object" flag was not set at 832, then microcontroller 114 also deals with a new title. Microcontroller 114 decodes the new title at 844, arranges the titles for display at 846, and displays the titles at 848 using MPEG-4 decoder 116, with a return to 802.

The invention claimed is:

1. Apparatus for providing digital services to a plurality of customers comprising:
   a processor;
   an encoder for providing a main data stream comprising data encoded in a first format for representing an event;
   a title generator for generating an additional data stream containing data encoded in a second format for representing the availability of objects related to the event represented by the data included in the main data stream; and
   a multiplexer for:
   embedding the additional data stream in the main data stream to produce a combined data stream, said additional data stream being selectively usable by each customer for viewing objects represented by the additional data stream; and
   embedding at least one of said objects related to the event represented by the data included in the main data stream, the availability of which was represented in the additional data stream encoded in a second format, into said main data stream in response to a customer request.

2. The apparatus of claim 1 wherein the amount of data space available for each of the additional objects within the additional data stream being related to the interest of the customers.

3. The apparatus of claim 2 wherein the data included in the additional data stream and encoded in the second format comprises data in MPEG-4 format.

4. The apparatus of claim 3 wherein the data included in the main data stream and encoded in the first format comprises data in MPEG-2 format.

5. The apparatus of claim 1 wherein the data included in the main data stream and encoded in the first format comprises data in MPEG-2 format and the data included in the additional data stream and encoded in the second format comprises data in MPEG-4 format; and further comprising means for providing the combined data stream including the MPEG-2 format data and MPEG-4 format data to a customer via one communication channel.

6. The apparatus of claim 1 wherein the event represented by data included in the main data stream comprises an event receivable by all customers,
   the event being defined by a start time and an end time,
   the additional data stream containing at least one object related to the event,
   the additional data stream containing at least one object being transmitted between the start time and the end time of the event.

7. The apparatus of claim 6 wherein the data included in the main data stream and encoded in the first format comprises MPEG-2 encoded data and the data included in the additional data stream and encoded in the second format comprises MPEG-4 encoded data.

8. The apparatus of claim 1 wherein the data included in the main data stream and encoded in the first format comprises data encoded in MPEG-2 format and the data included in the additional data stream and encoded in the second format comprises data encoded in MPEG-4 format; and further comprising
   means for providing the combined data stream to a customer over a first communication channel; and
   means for receiving a customer response to the additional information via one of the first communication channel and a second communication channel different from the first communication channel.

9. The apparatus of claim 8, further comprising means for providing further additional information to the customer over the first communication channel in response to the customer response.

10. The apparatus of claim 9, further comprising means for collecting statistical information about customer responses.

11. A method of providing digital services to a plurality of customers, comprising the steps of:
    providing a main data stream comprising data encoded in a first data format for representing an event;
    generating an additional data stream containing data encoded in a second data format for representing the availability of objects related to the event represented by the data included in the main data stream;
    embedding the additional data stream in the main data stream to produce a combined data stream, said additional data stream being selectively usable by each customer for viewing objects represented by the additional data stream; and embedding at least one of said objects related to the event represented by the data included in the main data stream, the availability of which was represented in the additional data stream encoded in a second data format, into said main data stream in response to a customer request.

12. The method of claim 11 wherein the amount of data space available for each of the additional objects within the additional data stream being related to the interest of the customers.

13. The method of claim 12 wherein the data included in the additional data stream and encoded in the second data format comprises data in MPEG-4 format.

14. The method of claim 13 wherein the data included in the main data stream and encoded in the first data format comprises data in MPEG-2 format.

15. The method of claim 11 wherein the data included in the main data stream and encoded in the first data format comprises data in MPEG-2 format and the data included in the additional data stream and encoded in the second data format comprises data in MPEG-4 format; and further comprising the step of providing the combined data stream including the MPEG-2 format data and MPEG-4 format data to a customer via one communication channel.

16. The method of claim 11 wherein the event represented by data included in the main data stream comprises an event receivable by all customers,
    the event being defined by a start time and an end time,
    the additional data stream containing at least one object related to the event, and further comprising the step of transmitting the additional at least one object between the start time and the end time of the event.

17. The method of claim 16 wherein the data included in the main data stream and encoded in the first data format comprises MPEG-2 encoded data and the data included in the additional data stream and encoded in the second data format comprises MPEG-4 encoded data.

18. The method of claim 11 wherein the data included in the main data stream and encoded in the first data format comprises data encoded in MPEG-2 format and the data included in the additional data stream and encoded in the second data format comprises data encoded in MPEG-4 format; and further comprising the steps of:

provided the combined data stream to a customer over a first communication channel; and receiving a customer response to the additional information via one of the first communication channel and a second communication channel different from the first communication channel.

19. The method of claim 18, further comprising the step of providing further additional information to the customer over the first communication channel in response to the customer response.

20. The method of claim 19, further comprising the step of collecting statistical information about customer responses.

* * * * *